(12) United States Patent
Matthews

(10) Patent No.: US 8,286,383 B2
(45) Date of Patent: Oct. 16, 2012

(54) RIFLE SCOPE AND ALIGNING DEVICE

(76) Inventor: Nicholas David John Matthews, Leighton Buzzard (GB)

( * ) Notice: Subject to any disclaimer, the term of this patent is extended or adjusted under 35 U.S.C. 154(b) by 564 days.

(21) Appl. No.: 12/158,024

(22) PCT Filed: Dec. 13, 2006

(86) PCT No.: PCT/GB2006/004664
§ 371 (c)(1),
(2), (4) Date: Sep. 12, 2008

(87) PCT Pub. No.: WO2007/071930
PCT Pub. Date: Jun. 28, 2007

(65) Prior Publication Data
US 2009/0049733 A1    Feb. 26, 2009

(30) Foreign Application Priority Data

Dec. 21, 2005   (GB) ................................. 0525983.3

(51) Int. Cl.
*F41G 1/38* (2006.01)
(52) U.S. Cl. ................. 42/122; 42/121; 42/130; 42/142
(58) Field of Classification Search .................... 42/122, 42/121, 130, 142
See application file for complete search history.

(56) References Cited

U.S. PATENT DOCUMENTS

| | | | |
|---|---|---|---|
| 2,807,981 A | 10/1957 | Barnes | |
| 2,889,629 A * | 6/1959 | Darkenwald | 42/129 |
| 3,131,477 A * | 5/1964 | Thomas | 359/511 |
| 3,744,133 A * | 7/1973 | Fukushima et al. | 42/121 |
| 3,777,404 A | 12/1973 | Oreck | |
| 4,616,421 A | 10/1986 | Forsen | |
| 4,850,113 A * | 7/1989 | Doll | 42/130 |
| 5,005,308 A * | 4/1991 | Parks | 42/122 |
| 5,223,650 A * | 6/1993 | Finn | 42/122 |
| 5,442,860 A * | 8/1995 | Palmer | 42/120 |
| 5,499,455 A * | 3/1996 | Palmer | 42/120 |
| 5,657,571 A | 8/1997 | Peterson | |
| 5,878,504 A * | 3/1999 | Harms | 42/120 |
| 6,289,625 B1 | 9/2001 | Phares | |
| 6,811,268 B2 * | 11/2004 | Watson | 359/611 |
| 6,862,833 B1 | 3/2005 | Gurtner | |
| 7,100,319 B2 * | 9/2006 | Paige | 42/120 |
| 7,100,321 B2 * | 9/2006 | Holmberg | 42/142 |
| 7,530,193 B2 * | 5/2009 | Williamson et al. | 42/145 |
| 2004/0025397 A1 | 2/2004 | Malley | |
| 2004/0201886 A1 | 10/2004 | Skinner et al. | |
| 2009/0049733 A1 * | 2/2009 | Matthews | 42/122 |

FOREIGN PATENT DOCUMENTS

| | | |
|---|---|---|
| DE | 34 32 924 | 3/1986 |
| JP | 52-051953 | 4/1977 |
| WO | WO 99/27408 | 6/1999 |

* cited by examiner

*Primary Examiner* — Michelle Clement
(74) *Attorney, Agent, or Firm* — Knobbe Martens Olson & Bear LLP

(57) ABSTRACT

A rifle scope includes an ocular (6), an objective (4), a reticle (10) and an aligning device (20) that is displaced axially from the reticle and includes one or more markings (22a, 22b) that are visible in use to a shooter. The aligning device (20) is constructed and arranged such that with correct eye alignment the markings (22a, 22b) appear to be aligned with the reticle (10), and with incorrect eye alignment the markings appear to be misaligned with the reticle.

12 Claims, 3 Drawing Sheets

RIFLE SCOPE AND ALIGNING DEVICE

RELATED APPLICATIONS

This application is the U.S. National Phase filing under 35 U.S.C. §371 of PCT/GB2006/004664, filed Dec. 13, 2006, which designated the United States and was published in English, which claims priority under 35 U.S.C. §119 (a)-(d) to Great Britain Patent Application No. 0525983.3, filed Dec. 21, 2005. The contents of these applications is incorporated herein by reference in their entireties.

FIELD OF THE INVENTION

The present invention relates to a rifle scope: that is, a telescopic sight for rifles and other guns. The invention also relates to an aligning device for use with a rifle scope, to ensure correct eye alignment and prevent parallax error, so improving the accuracy of shooting.

BACKGROUND OF THE INVENTION

Accurate and consistent shooting requires central eye alignment through a rifle scope to prevent parallax error. Parallax error causes the image of the target to move in relation to the cross hairs viewed through the scope, thus affecting accuracy. Current rifle scopes rely on the shooter's experience to align the eye correctly (i.e. on the optical axis of the scope). If the shooter misjudges this, inaccuracy can result.

Inaccuracy can also be caused by cant: that is by rotation of the rifle about its axis from the vertical plane. Unless the scope is set at zero elevation (i.e. parallel to the axis of the barrel), cant causes the shot to veer to one or other side of the aiming point.

WO 99/27408 describes a sight scope having a main reticle and a secondary reticle that is mounted within the scope and is axially displaced from the main reticle. By aligning the two reticles, correct eye alignment can be checked thereby reducing the possibility of parallax error. The scope does however have a number of disadvantages. The axial spacing of the two reticles is relatively small, which makes it difficult to see small misalignments. Because the reticles are both mounted internally and seen only in silhouette, they can be difficult to distinguish, particularly in poor lighting conditions. The secondary reticle also partially obstructs the view through the scope and may be distracting. Further, because existing scopes cannot be easily adapted to use a secondary reticle, the arrangement is applicable for practical purposes only to new scopes. The scope also does not address the problem of cant.

SUMMARY OF THE INVENTION

According to one aspect of the present invention there is provided a rifle scope including an ocular, an objective, a reticle and an aligning device that is mounted externally of the scope adjacent the ocular, the aligning device having one or more markings that are arranged around the ocular so that they are visible in use to a shooter, wherein the aligning device is constructed and arranged such that with correct eye alignment the markings appear to be aligned with the reticle, and with incorrect eye alignment the markings appear to be misaligned with the reticle.

The inclusion of an aligning device makes it very easy for a shooter to check for correct eye alignment and to correct for any misalignment. The accuracy of shooting may thus be improved. Because the aligning device is mounted externally, it is lit by ambient light, which makes it easy to see and distinguish from the reticle. The view through the scope is also unobstructed. The large axial separation of the aligning device from the reticle makes it easy to identify incorrect alignment of the eye. The aligning device is also simple, robust and relatively inexpensive, and so does not significantly increase the total cost of the rifle scope. In addition, the markings may be used to check for cant. Because they are arranged around the periphery of the ocular, close to the periphery of the shooter's vision, a small degree of cant can be easily recognised.

Advantageously, the reticle includes cross hairs and the markings of the aligning device comprise quadrant markings that may be aligned in use with the cross hairs.

Advantageously, the markings extend inwards from the periphery of the ocular and overlap with the exit pupil of the scope, allowing their alignment with the reticle to be checked easily.

Advantageously, the aligning device carries one or more alternative markings that are angularly displaced from the first markings, the aligning device being rotatable to align the alternative markings with the reticle. Advantageously, the markings and the alternative markings have different visibility characteristics for use in different lighting conditions. For example, the markings may be light or dark, differently coloured, reflective, fluorescent or illuminated.

Advantageously, the aligning device is removably attached to a free end of the ocular. Preferably, the aligning device comprises a ring that carries the markings and is mounted on the free end of the ocular. This form of the invention is extremely simple and inexpensive, whilst remaining highly effective. The device can also be easily retro-fitted to existing rifle scopes, so improving them at minimal additional cost.

The aligning device may include a cover element for covering the ocular when the scope is not in use. The cover element is preferably hinged. The aligning device thus provides a secondary function of protecting the ocular.

According to another aspect of the invention there is provided an aligning device for use with a rifle scope that includes an ocular, an objective and a reticle, wherein the aligning device is constructed and arranged to be mounted externally of the scope adjacent the ocular, the aligning device having one or more markings that in use are arranged around the ocular so that they are visible to a shooter, the aligning device further being constructed and arranged such that during use with correct eye alignment the markings appear to be aligned with the reticle, and with incorrect eye alignment the markings appear to be misaligned with the reticle.

Advantageously, the markings of the aligning device comprise quadrant markings that may be aligned in use with cross hairs on the reticle.

Advantageously, the markings extend inwards so that in use they overlap with the exit pupil of the scope.

Advantageously, the aligning device carries one or more alternative markings that are angularly displaced from the first markings, the aligning device being rotatable in use to align the alternative markings with the reticle.

The markings and the alternative markings preferably have different visibility characteristics.

Advantageously, the aligning device is constructed and arranged to be removably attached to a free end of the ocular. The aligning device preferably comprises a ring that carries the markings and is constructed and arranged to be mounted on the free end of the ocular.

Advantageously, the aligning device includes a cover element for covering the ocular when the scope is not in use. The cover element is preferably hinged.

Various embodiments of the invention will now be described by way of example with reference to the accompanying drawings, in which:

DETAILED DESCRIPTION OF THE PREFERRED EMBODIMENT

Figure 1:
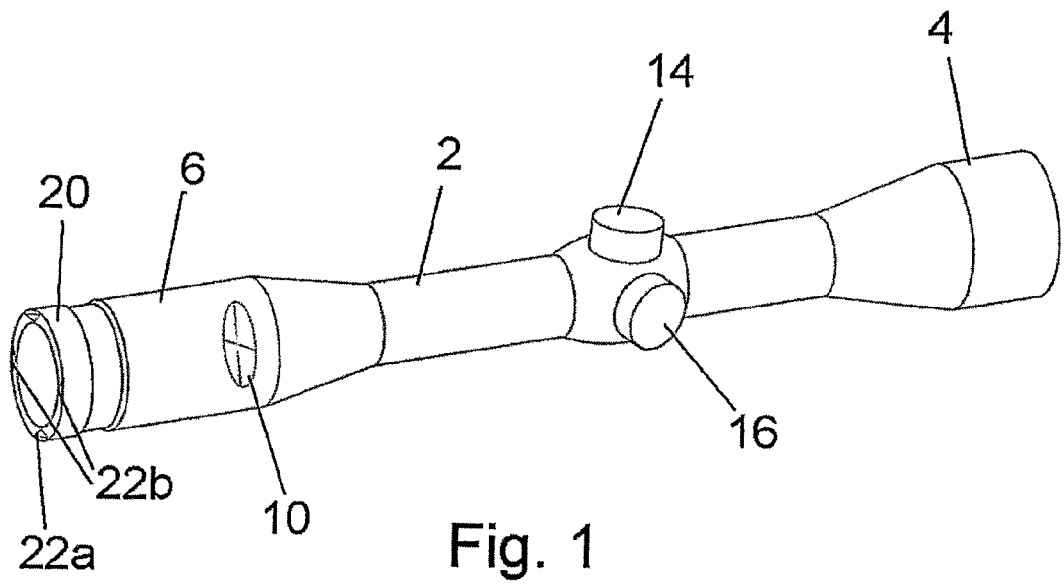
FIG. 1 is a perspective view of a rifle scope according to a first embodiment of the invention.
Figure 2:
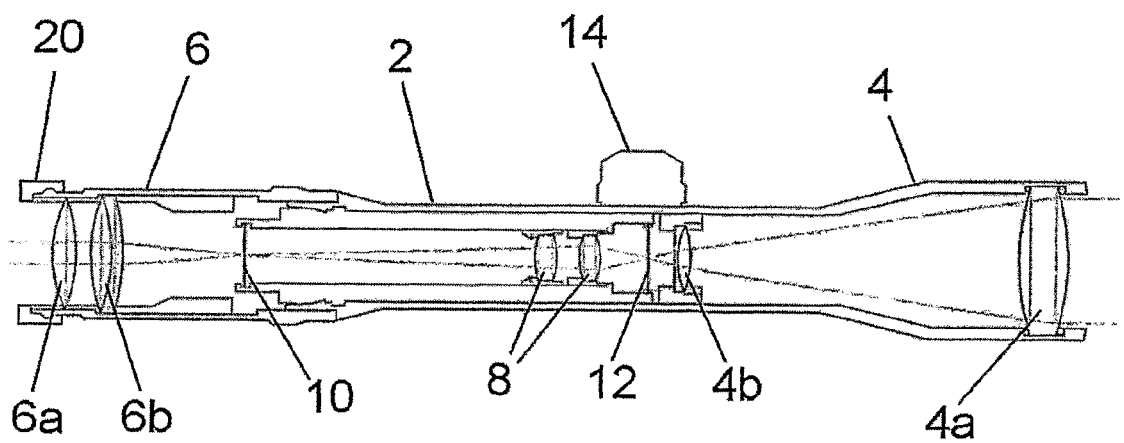
FIG. 2 is a side section through the first rifle scope.

FIGS. 1 and 2 show a rifle scope according to a first embodiment of the invention. The rifle scope includes a cylindrical body 2 having an objective 4 at one end and an ocular 6 (or eye piece) at the opposite end. In the embodiment, the objective 4 includes two sets of objective lenses 4a,4b and the ocular 6 includes two sets of ocular lenses 6a,6b. Between the objective and the ocular, the scope includes a set of erector lenses 8.

The scope includes a reticle 10, for example a pair of cross hairs 11, which the shooter uses for aiming. In the embodiment, the reticle 10 is located in the focal plane of the ocular 6, which is the preferred position for hunting. Alternatively, the reticle may be placed in the objective focal plane 12, this being the preferred position for tactical (military) uses. The scope includes an elevation turret 14 and windage turret 16, which are used for adjusting the vertical and horizontal positions of the reticle.

All the features described above are entirely conventional and will not therefore be described in further detail.

The rifle scope includes an aligning device for ensuring correct axial alignment of the aiming eye with the scope, to prevent parallax error. In the embodiment shown in FIGS. 1 and 2, the aligning device comprises an annular ring 20 that is fitted to the end of the ocular 6. The ring 20 is marked on its end face with four quadrant markings 22a,22b. Two of the quadrant markings 22a are aligned with the vertical axis of the ocular and the other two markings 22b are aligned with the horizontal axis of the ocular. The markings may be created by any suitable method, for example they may be engraved, painted or printed. Alternatively, fluorescent or illuminated markings may be provided for use in low light conditions.

Figures 3, 4:
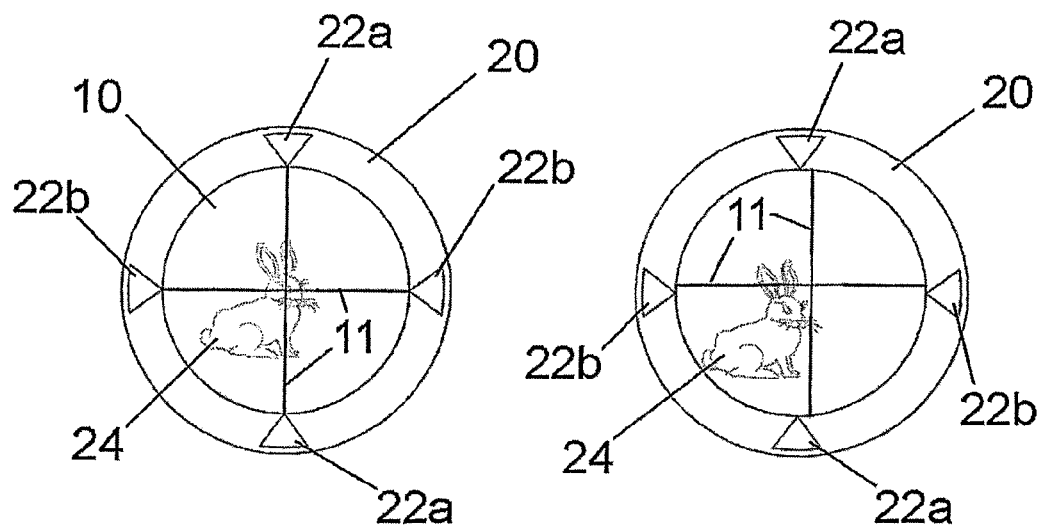
FIG. 3 illustrates a view of a target through the rifle scope.
FIG. 4 illustrates the effect of parallax on the view of a target.

Use of the scope is illustrated in FIGS. 3 and 4. FIG. 3 illustrates the view through the scope with correct eye alignment (i.e. with the aiming eye located on the optical axis of the scope). It should be noted that the cross hairs of the reticle 10 are aligned with the quadrant markings 22a,22b. This confirms correct axial eye alignment with the scope, so eliminating parallax error. The cross hairs 11 of the reticle 10 are located centrally within the field of vision and are aligned with a target 24, showing that the rifle is correctly aimed at the target.

FIG. 4 illustrates the view through the scope with incorrect eye alignment (i.e. with the aiming eye displaced from the optical axis of the scope). It should be noted that the cross hairs 11 of the reticle 10 now appear to be displaced from the centre of the field of vision and are not aligned with the quadrant markings 22a,b. As a result of parallax error, the cross hairs 11 are no longer aligned with the target 24, even though the aim of the gun has not changed. If the shooter adjust the aim to bring the cross hairs onto the target, an inaccurate shot will result. The inaccurate aim is caused by the effect of parallax error resulting from incorrect eye alignment.

It is thus easy for the shooter to see that his or her eye alignment is incorrect, as the cross hairs 11 of the reticle 10 will not be aligned with the quadrant markings 22a,22b on the ring 20. By comparing the apparent positions of the cross hairs and the quadrant markings, the shooter can reposition his or her head for correct eye alignment, thus avoiding parallax error and improving the accuracy of aiming.

A further advantage provided by the invention is that the quadrant markings 22a,b help the shooter to avoid cant (unintentional rotation of the gun about the axis of the barrel from a true vertical position). The positions of the quadrant markings 22a,22b may be compared with any suitable horizontal or vertical reference such as the horizon or a wall and, if necessary, the gun can be rotated to eliminate cant. The same effect can of course be achieved in a conventional scope by comparing the cross-hairs with any suitable horizontal or vertical reference. However, cant is not then particularly noticeable, since shooters tend to concentrate only on objects at the centre of the cross-hairs. In the invention, because the quadrant markings are highly visible and extend outwards beyond the exit pupil of the scope, they provide a much stronger reference than the cross-hairs and show even small degrees of cant much more clearly. It is therefore far easier to avoid cant, which further improves the accuracy of shooting.

Figures 5, 6:
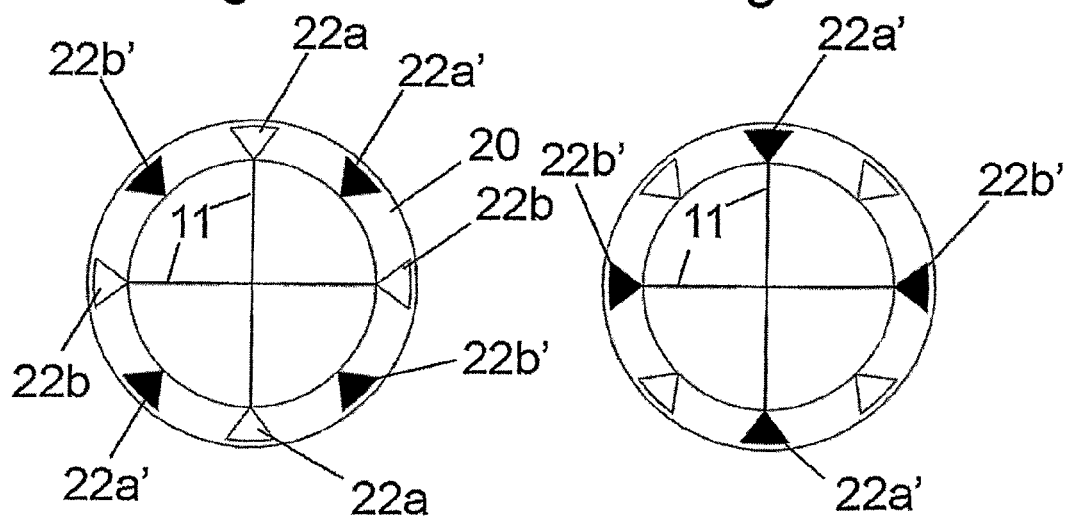
FIG. 5 illustrates the view through a rifle scope according to second embodiment of the invention.
FIG. 6 illustrates a view through the second rifle scope, in an alternative configuration.

FIGS. 5 and 6 illustrate a second embodiment of the invention, in which the ring 20 carries two separate sets of quadrant markings 22a,22b and 22'a, 22'b. The ring 20 can be rotated counter-clockwise from the position shown in FIG. 5 through an angle of 45° to the position shown in FIG. 6. When the ring is in the position shown in FIG. 5, eye alignment is checked using the first set of quadrant markings 22a,22b, and when the ring is rotated to the second position shown in FIG. 6, eye alignment is checked using the second set of quadrant markings 22'a, 22'b.

The two sets of markings 22a,22b and 22'a, 22'b have different visibilities and are designed for use under different light conditions. For example, the first set of markings 22a, 22b may be coloured white for use in low light conditions, and the second set of markings 22'a, 22'b may be coloured black for use under bright light conditions. Other colours may of course be used, or one or both sets of markings may be reflective, fluorescent or illuminated.

Figure 7:
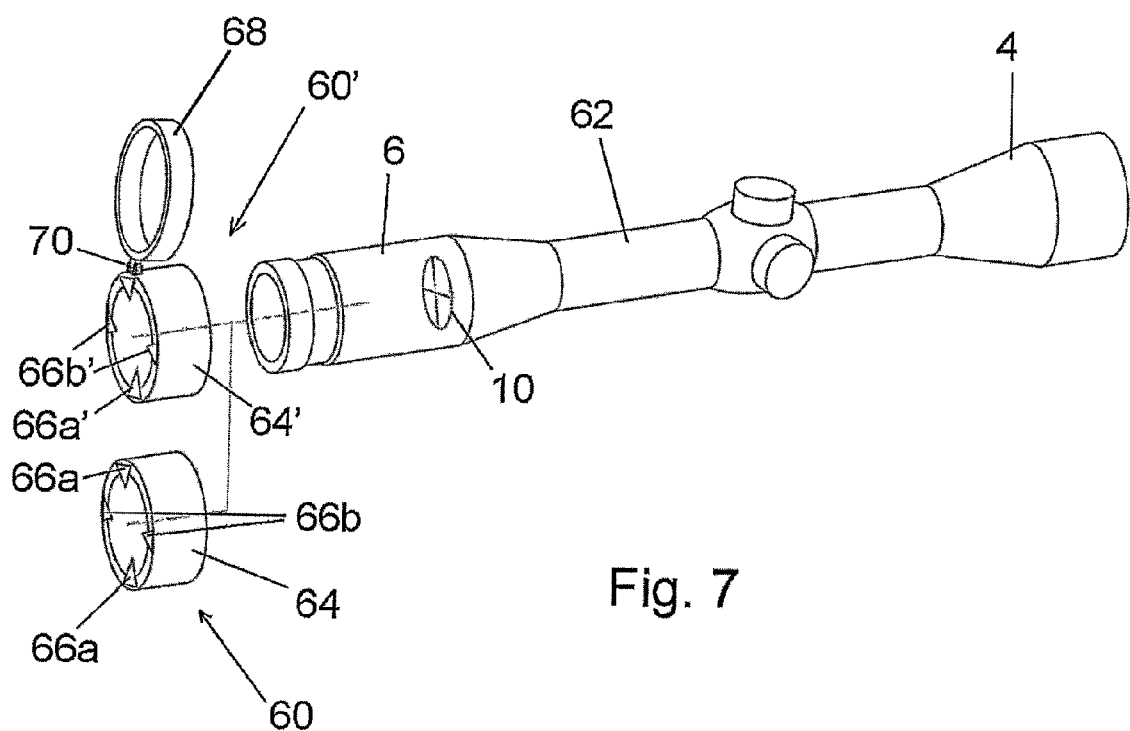
FIG. 7 is a perspective view of a conventional rifle scope, together with two aligning devices according to third and fourth embodiments of the invention

FIG. 7 illustrates two further embodiments of the invention, in which the aligning device 60,60' comprises an accessory for retrofitting to an existing conventional rifle scope 62, which includes an ocular 6, an objective 4 and a reticle 10.

The first aligning device 60 comprises an annular ring 64 that can be fitted to the end of the ocular 6, preferably with a push fit. The ring 64 is marked on its end face with four quadrant markings 66a,66b. The markings may be created by any suitable method, for example they may be engraved, painted or printed. Alternatively, fluorescent or illuminated markings may be provided for use in low light conditions. In this embodiment, the quadrant markings 22a,b extend inwards from the ring and slightly overlap the exit pupil of the ocular. This makes it easier to check that the markings are correctly aligned with the cross hairs of the reticle.

Before use, the ring 64 is adjusted so that two of the quadrant markings 66a are aligned with the vertical axis of the ocular and the other two markings 66b are aligned with the horizontal axis of the ocular. The markings are visible in use to a shooter and are constructed and arranged such that with correct eye alignment the markings appear to be aligned with the reticle, and with incorrect eye alignment the markings appear to be misaligned with the reticle.

The second aligning device 60' is similar in most respects to the first device, and comprises an annular ring 64' that can be fitted to the end of the ocular 6, preferably with a push fit. The ring 64' is marked on its end face with four quadrant markings 66a',66b'. The device also includes an adjustable lens cap 68, which is attached to the ring 64' by a hinge 70. The lens cap 68 may be rotated from the open position shown in FIG. 7 to a closed position (not shown), in which it covers and protects the end of the ocular 6.

The invention claimed is:

1. A rifle scope comprising an ocular, an objective, a reticle and an anti-parallax aligning device that is mounted externally of the scope adjacent the ocular, the aligning device comprising a ring having an annular end face with an inner radius and an outer radius, and one or more markings carried on the end face that are arranged around the ocular and extend outwards beyond the exit pupil of the ocular from the inner radius towards the outer radius so that they are visible in use to a shooter without obstructing the view through the scope, said markings comprising quadrant markings that can be aligned in use with the reticle, wherein said markings are reflective, fluorescent or illuminated so that they have a high visibility, wherein the aligning device is constructed and arranged such that with correct eye alignment the markings appear to be aligned with the reticle, and with incorrect eye alignment the markings appear to be misaligned with the reticle, thereby helping the shooter to avoid parallax error.

2. A rifle scope according to claim 1, in which the aligning device carries one or more alternative markings that are angularly displaced from the first markings, the aligning device being rotatable to align the alternative markings with the reticle.

3. A rifle scope according to claim 2, in which the markings and the alternative markings have different visibility characteristics.

4. A rifle scope according claim 1, in which the aligning device is removably attached to a free end of the ocular.

5. A rifle scope according claim 1, in which the aligning device includes a cover element for covering the ocular when the scope is not in use.

6. A rifle scope according to claim 5, in which the cover element is hinged.

7. An anti-parallax aligning device for use with a rifle scope that includes an ocular, an objective and a reticle, wherein the aligning device is constructed and arranged to be mounted externally of the scope adjacent the ocular, the aligning device comprising a ring having an annular end face with an inner radius and an outer radius, and one or more markings carried on the end face that in use are arranged around the ocular and extend outwards beyond the exit pupil of the ocular from the inner radius towards the outer radius so that they are visible to a shooter without obstructing the view through the scope, said markings comprising quadrant markings that can be aligned in use with the reticle, wherein said markings are reflective, fluorescent or illuminated so that they have a high visibility, the aligning device further being constructed and arranged such that during use with correct eye alignment the markings appear to be aligned with the reticle, and with incorrect eye alignment the markings appear to be misaligned with the reticle, thereby helping the shooter to avoid parallax errors.

8. An aligning device according to claim 7, in which the aligning device carries one or more alternative markings that are angularly displaced from the first markings, the aligning device being rotatable in use to align the alternative markings with the reticle.

9. An aligning device according to claim 8, in which the markings and the alternative markings have different visibility characteristics.

10. An aligning device according to claim 7, in which the aligning device is constructed and arranged to be removably attached to a free end of the ocular.

11. An aligning device according to claim 7, in which the aligning device includes a cover element for covering the ocular when the scope is not in use.

12. An aligning device according to claim 11, in which the cover element is hinged.

* * * * *